(12) United States Patent
Imaoka

(10) Patent No.: US 7,129,446 B2
(45) Date of Patent: Oct. 31, 2006

(54) REFLOW DEVICE

(75) Inventor: Norio Imaoka, Takamori-machi (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 10/829,099

(22) Filed: Apr. 21, 2004

(65) Prior Publication Data
US 2004/0245316 A1 Dec. 9, 2004

(30) Foreign Application Priority Data
Apr. 22, 2003 (JP) ............................. 2003-117169

(51) Int. Cl.
F27B 9/06 (2006.01)
F27D 11/00 (2006.01)

(52) U.S. Cl. ................... 219/388; 219/395; 219/402; 228/47.1; 228/227

(58) Field of Classification Search .................. 228/43, 228/47.1, 234.1, 248.1; 219/388, 390
See application file for complete search history.

(56) References Cited

U.S. PATENT DOCUMENTS 4,817,851 A * 4/1989 Kolesar et al. ............. 228/119
6,130,408 A * 10/2000 Fukuda et al. ............. 219/216
6,768,083 B1 * 7/2004 Rae et al. ................... 219/388
6,845,901 B1 * 1/2005 Koopmans ............... 228/248.1
6,936,793 B1 * 8/2005 Shiloh et al. ............... 219/400
2002/0023946 A1 * 2/2002 Lakra et al. ................ 228/227
2005/0132753 A1 * 6/2005 Shimizu et al. .............. 65/381

FOREIGN PATENT DOCUMENTS

JP 2003-8289 1/2003

* cited by examiner

Primary Examiner—Lynne R. Edmondson
(74) Attorney, Agent, or Firm—Harness, Dickey & Pierce, P.L.C.

(57) ABSTRACT

A device is provided to heat the whole heated surface of a carried member carried intermittently with a temperature change over time maintained constant. The device controls the driving of a belt-conveyer so that a heater moves in a carrying direction at a carry time movement velocity that is slower than the carry velocity of a TAB tape if the TAB tape is in a carried state. On the other hand, the heater moves in an opposite carrying direction at a carry standby time movement velocity derived from the difference between the carry velocity and the carry time movement velocity if the TAB tape is in a carry standby state.

6 Claims, 6 Drawing Sheets

HIGH
TEMPERATURE
SETTING PORTION

REFLOW DEVICE

RELATED APPLICATIONS

This application claims priority to Japanese Patent Application No. 2003-117169 filed Apr. 22, 2003 which is hereby expressly incorporated by reference herein in its entirety.

BACKGROUND

1. Field of the Invention

The present invention relates to a reflow device to reflow a carried member that is carried intermittently.

2. Description of the Related Art

Conventionally, there have been a mounting method and a mounting device to mount electronic components on a tape-shape substrate, in which the tape-shape substrate with a plurality of circuit patterns being formed thereon in series is intermittently carried, and printing of cream solder, mounting of electronic components, and reflow soldering performed by putting the tape-shape substrate through the reflow device, are successively implemented, in order to improve the mounting efficiency of electronic components on the substrate. (Refer to Japanese Unexamined Patent Application Publication 2003-8289, for example)

In order to realize a preferable reflow soldering using a reflow device, it is necessary to heat a tape-shape substrate in accordance with a given heating pattern, in other words, a temperature profile showing temperature change over time. According to the conventional example described above, however, there is an unsolved problem that the heated surface of the tape-shape substrate passing through the reflow device is not heated so that the temperature change over time is constant since the tape-shape substrate for which carrying and carry standby are periodically repeated, is reflowed only by passing through the reflow device.

In view of the unsolved problem of the above-described conventional example, the present invention is intended to provide a reflow device to heat the whole heated surface of a carried member carried intermittently, while keeping the temperature change over time of the heated surface constant.

SUMMARY

In order to achieve the purpose described above, the reflow device according to a first aspect of the present invention is a reflow device including a heater to heat a carried member to be carried intermittently and comprising a driving mechanism to drive the heater back and forth freely along a carrying direction of the carried member and a driving control mechanism to control the driving of the driving mechanism so as to keep constant the relative velocity between the carried member and the heater.

The reflow device is characterized in that the driving control means controls the driving of the control mechanism so that the heater moves in the carrying direction at a carry time movement velocity that is slower than the carry velocity of the carried member if the carried member is in a carried state, and the heater moves in an opposite direction at a carry standby time movement velocity derived from the difference between the carry velocity and the carry time movement velocity if the carried member is in a carry standby state.

Thereby, it is surely possible to heat the heated surface of the carried member carried intermittently with the temperature change over time being constant, because the carried member always passes through the heater at a constant relative velocity.

Also, the driving control means according to the reflow device controls the driving of the driving mechanism so that the heater moves in the opposite carrying direction at the carry standby time movement velocity if the carrying of the carried member stops abnormally.

According to this, it is possible to continue to heat the heated surface of the carried member with the temperature change over time being constant, because the relative velocity between the carried member and the heater is kept constant, even if the carrying of the carried member stops abnormally.

Moreover, the driving control means controls the driving of the driving mechanism so that the heater reciprocates in a steady section between a carry starting position and a carry standby starting position if the intermittent carrying of the carried member is in a steady state.

Thereby, the heater moves in a steady section from the carry starting position to the carry standby starting position if the carried member is in a carried state. Meanwhile, the heater moves in the steady section from the carry standby starting position to the carry starting position if the carried member is in a carry standby state. It therefore is possible to prevent an increase of the movement space of the heater.

According to the reflow device, the driving mechanism includes an unsteady section to which the heater can move beyond the carry starting position from the steady section.

Thereby, the heater can move not only in the steady section but also to a section beyond the carry starting position. As a result, it is possible to give continuous heating with the temperature change over time being constant even if the carrying of the carried member stops abnormally and the heater moves in the opposite carrying direction. Accordingly, the longer the unsteady section in which the heater can move is, the longer the period to continue heating the carried member becomes if the carrying of the carried member stops abnormally.

Furthermore, the reflow device further comprises a heater evacuation means to evacuate (remove) the heater from the carried member if the carrying of the carried member stops abnormally and the driving of the heater by the driving mechanism to keep the relative velocity to the carried member constant becomes impossible.

According to this, heating the carried member continues as far as the heater is movable, even if the carried member stops abnormally. On the other hand, if the heater reaches its limitation, beyond which it cannot move while keeping the given relative velocity to the carried member any more, the heater is immediately evacuated from the carried member. As a result, it is surely possible to prevent quality deterioration caused by overheating of the carried member.

DETAILED DESCRIPTION

A preferred embodiment of the present invention will be described below, referring to the figures.

Figure 1:
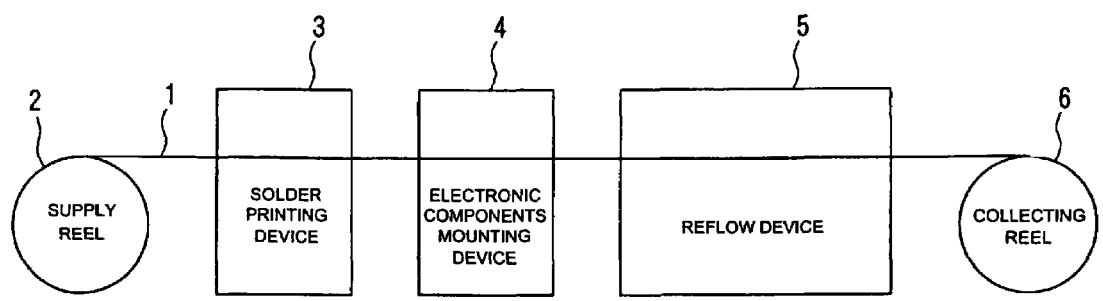
FIG. 1 is a diagram schematically showing a structure of a mounting device.

FIG. 1 is a diagram schematically showing a structure of a mounting device to mount electronic components on a tape-shape substrate. Referring to FIG. 1, a TAB (Tape Automated Bonding) tape 1 is composed of polyimide resin, for example, with a plurality of circuit patterns being formed thereon. Also, a plurality of sprocket holes (not shown in the figure) is provided at the both ends of the width direction of the TAB tape 1 with the given intervals in the longitudinal direction. Thereby, reel-to-reel carrying is realized. In other words, the TAB tape 1 is sent out from a supplying reel 2, goes through a solder printing device 3, an electronic components mounting device 4, and a reflow device 5, successively in that order, to be rolled up by a collecting reel 6. Thus, the TAB tape is carried.

First, in the solder printing device 3, cream solder is printed on lands and so on, to which the TAB tape 1 is to be joined by a screen print technique, for example. In the electronic components mounting device 4, electronic components are mounted on the TAB tape 1 with the cream solder being printed, by a mounting head (not shown in FIG. 1). Then, in the reflow device 5, electronic components are solder-bonded to the TAB tape 1 by reflowing, in which the cream solder is melted (once) and solidified again.

Thus, in this case where the solder print, the electronic component mounting and the reflow are successively implemented, it is necessary to stop carrying the TAB tape 1 temporarily when the solder is printed and the electronic components are mounted. TAB tape 1 therefore must be carried intermittently. Accordingly, the supply reel 2 and the collecting reel 6 repeat the carry mode and the carry standby mode periodically. That is, the supply reel 2 and the collecting reel 6 carry the TAB tape 1 for the length of the part where the solder print via the solder printing device 3 and the mounting of electronic components via the electronic components mounting device 4 have been completed, and then keeps the TAB tape 1 on standby as long as the time until the solder printing and mounting of the electronic components are completed.

Figure 2:
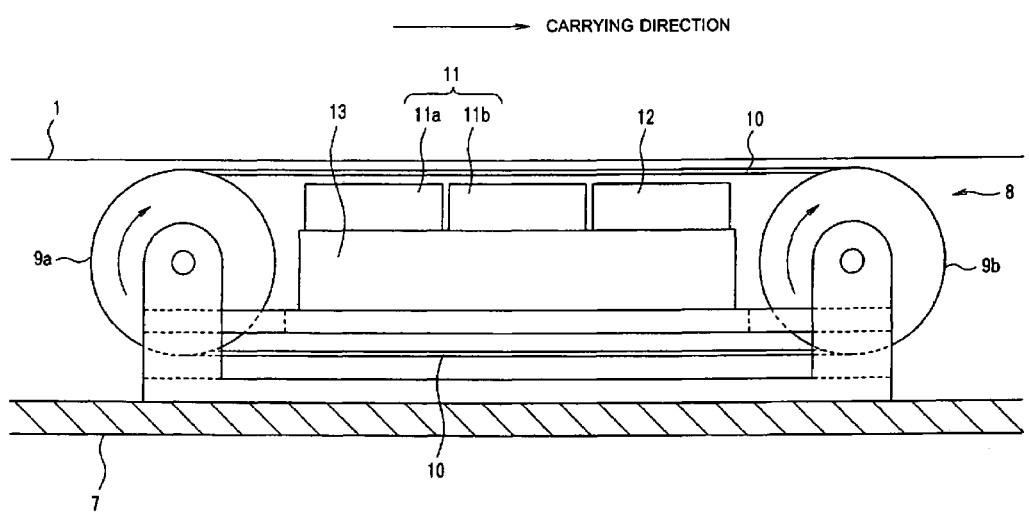
FIG. 2 shows a reflow device in a first embodiment.

As shown in FIG. 2, the reflow device 5 comprises a belt conveyer 7, which is disposed below the carried TAB tape 1 and can move back and forth freely within a given section along the carrying direction of the TAB tape 1. The given section will be described later in more detail. A heating unit 8, which is fixed to the belt conveyer 7 to reflow the TAB tape 1, is mounted between the TAB tape 1 and the belt conveyer 7.

A roller 9a and a roller 9b, including a revolution shaft provided in the direction parallel to the width-wise direction of the TAB tape 1, and a cylinder face adjacent to the TAB tape 1, are disposed so as to be rotated freely at the both ends of the longitudinal direction of the heating unit 8. A metal belt 10, flexible and endless, is hung on the rollers 9a and 9b. The TAB tape 1 is brought into contact with the metal belt 10.

The heating unit 8 comprises a heater 11 including a pre-heater 11a and a main heater 11b, and a cooler 12, in that order from the up stream side of the carrying direction. The pre-heater 11a heats the TAB tape 1 from the lower side through the metal tape 10 until its temperature reaches a given temperature (about 100–180 degrees centigrade) as preparation heating. The main heater 11b heats it until its temperature exceeds the solder melting point (about 220–230 degrees centigrade) as main heating. The cooler 12 lowers the temperature below the solder melting point. In this case, the heater 11 includes an electric heater or an infrared ray lamp, for example. The cooler 12 includes an aluminum sheet with good heat conductivity, and so on.

The heating unit 8 further comprises an elasticity mechanism 13 including an air cylinder, for example. The elasticity mechanism 13 expands and contracts so that the heater 11 and the cooler 12 can move between the steady position, in which the heater 11 and the cooler 12 are to reflow the TAB tape 1 and the evacuation position, to which the heater 11 and the cooler 12 are to be evacuated (removed) from the TAB tape 1.

Figure 3:
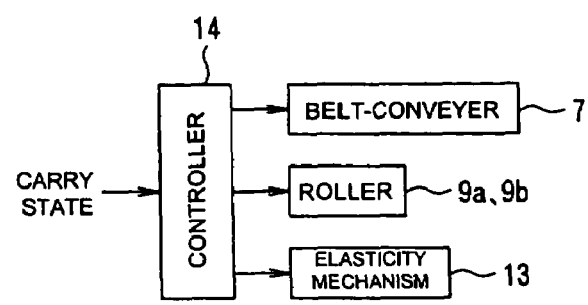
FIG. 3 is a block diagram of controlling.

As shown in FIG. 3, the belt-conveyer 7, the rollers 9a and 9b, and the elasticity mechanism 13 are interconnected to a controller 14 including a micro-computer, for example. The controller 14 controls the driving of the belt-conveyer 7, the rollers 9a and 9b and the elasticity mechanism 13 based on the carry condition of the TAB tape 1.

That is, the controller 14 drives the belt-conveyer 7 so that the relative velocity between the TAB tape 1 and the heater 11 disposed in the heating unit 8 can be kept constant. More particularly, the belt-conveyer 7 is driven so that the heater 11 of the heating unit 8 can move in the carrying direction at a carry time movement velocity that is slower than the carry velocity of the TAB tape 1 if the TAB tape 1 is in the carried state. On the other hand, the heating unit 8 can move in the opposite carrying direction at a carry standby time movement velocity derived from the difference between the carry velocity and the carry time movement velocity if the TAB tape 1 is in the carry standby state. Also, if the intermittent carrying of the TAB tape 1 is in a steady state, the movement quantities of the TAB tape 1 in the carried state and that in the carry standby state are made equal to each other. That is, the heater 11 is made to come back and forth within the steady section, in other words, between the carry starting position and the carry standby starting position.

In this case, if the carry time of the TAB tape 1 is Tc, its carry standby time is Ts, its carry distance is Dt, its carry velocity is Vt (=Dt/Tc), and the carry time movement velocity of the heater 11 is Vc, its movement distance during the carry time is Dc (=Tc·Vc), its carry standby time movement velocity is Vs, its movement distance during the carry time is Ds(=Ts·Vs), and the distance of the steady section is Dr, the following conditions of formulas (1) and (2) are satisfied.

$$Vs=Vt-Vc$$

$$Vs=Dt/Tc-Vc \ldots \quad (1)$$

$$Dr=Dc=Ds$$

$$Tc\cdot Vc=Ts\cdot Vs \ldots \quad (2)$$

Therefore, according to the above formulas (1) and (2), the carry time movement velocity of the heater 11 Vc and its carry standby time movement velocity Vs are shown as the following formulas (3) and (4), with using carry time Tc, carry standby time Ts and carry distance Dt.

$$Vc=Ts\cdot Dt/Tc\ (Tc+Ts) \ldots \quad (3)$$

$$Vs=Dt/(Tc+Ts) \ldots \quad (4)$$

Of course, various kinds of conditions other than the heating time for the TAB tape 1 (the relative velocity between the TAB tape 1 and the heater 11) should be considered in order to decide the carry time movement velocity Vc and the carry standby time movement velocity Vs, which may not be decided unequivocally from the above formulas (3) and (4). However, the belt-conveyer 7 is driven in accordance with the carry time movement velocity Vc and the carry standby time movement velocity Vs satisfying the conditions of these formulas (3) and (4).

If the carrying of the TAB tape 1 stops abnormally, the belt-conveyer 7 is driven so that the heater 11 may move in the opposite carrying direction at the carry standby time movement velocity Vs.

Figure 4:
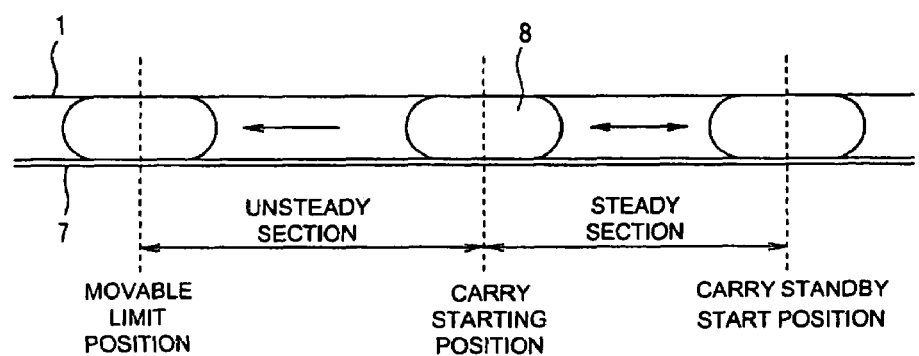
FIG. 4 is a diagram showing a movable section of a belt-conveyer.

The belt-conveyer 7 therefore is provided with an unsteady section so that the heater 11 can move beyond the carry starting position from the steady section if the heater 11 moves in the opposite carrying direction due to the abnormal stoppage of the TAB tape 1. In other words, as shown in FIG. 4, the range in which the belt-conveyer 7 can move back and forth includes the steady section and the unsteady section. If the carrying of the TAB tape 1 is in the steady state, the belt-conveyer 7 moves in the steady section, on the other hand, if the TAB tape stops abnormally, the belt-conveyer 7 can move in the opposite carrying direction beyond the steady section.

The controller 14 drives the elasticity mechanism 13 so as to keep the heater 11 in the steady section while the heater 11 can be driven to keep the constant relative velocity to the TAB tape 1 by the belt-conveyer 7. At the same time, the controller 14 drives the rollers 9a and 9b so that the relative velocity between the metal belt 10 and the TAB tape 1 at the contact face thereof may be 0 (zero), in other words, the contact face of the metal belt 10 and the TAB tape 1 may move in the carrying direction at the same velocity as the carry standby time movement velocity Vs.

On the other hand, if it is impossible to drive the heater 11 to keep the constant relative velocity to the TAB tape 1 by the belt-conveyer 7, the driving of the belt-conveyer 7, and the rollers 9a and 9b is stopped, and the elasticity mechanism 13 is driven so that the heater 11 may be evacuated to the evacuation position.

As described above, the heater 11, the belt-conveyer 7, the controller 14, and the elasticity mechanism 13 as shown in FIG. 1 correspond to a heater, a driving mechanism, a driving control means and a heater evacuation means, respectively.

Next, the operation of the above mentioned embodiment is explained.

Here, the TAB tape 1 is intermittently carried, with the carried state and the carry standby state repeated periodically, by the supply reel 2 and the collecting reel 6. The TAB tape 1 passes through the solder printing device 3, electronic components mounting device 4 and the reflow device 5.

At this time, the solder print via the solder printing device 3 and the mounting of electronic components via the electronic components mounting device 4 are implemented, while the TAB tape 1 is in the carry standby state. Generally speaking, the time required for the solder print is longer than that for the electronic components mounting. In the embodiment, it takes 15 seconds to solder print for 30 cm of the TAB tape 1, for example. Therefore, the carry standby time Ts of the TAB tape 1 is set to be 15 seconds, depending on the time needed for the solder print. Within these 15 seconds, it is necessary to do the solder printing and mount the electronic components on the TAB tape 1 for 30 cm. After 15 seconds passes, just 30 cm of the TAB tape 1 is carried to the downstream side. If its carry time Tc is defined as 2 seconds, for example, the carry velocity Vt becomes 15 cm/second. Accordingly, as for the carry velocity of the TAB tape 1, 0 cm/second at carry standby time and Vt=15 cm/second at carry time are periodically repeated.

In the reflow device 5, the belt conveyer 7 is driven so that the relative velocity between the TAB tape 1 and the heater 11 may be kept constant to reflow the TAB tape 1. First, if the TAB tape 1 is in the carried state, the carry time movement velocity Vc to move the belt conveyer 7 in the carrying direction is about 13.2 cm/second, which is derived from the formula (3). On the other hand, if the TAB tape 1 is in the carry standby state, the carry standby time movement velocity Vs to move the belt conveyer 7 in the opposite carrying direction is about 1.8 cm/second, which is derived from the formula (4).

Figure 5A:
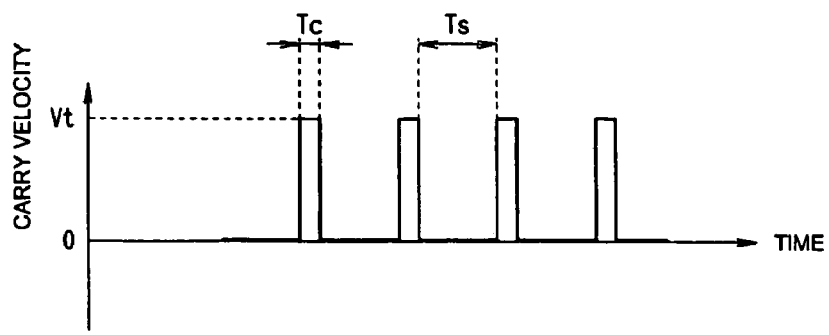
FIGS. 5A–C are time charts of relative velocity.
Figure 5B:
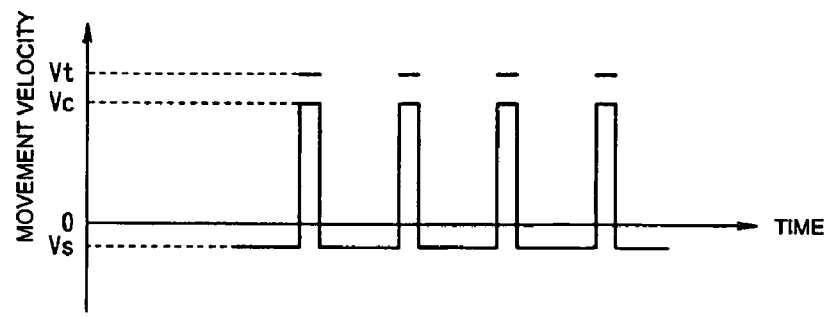
Figure 5C:
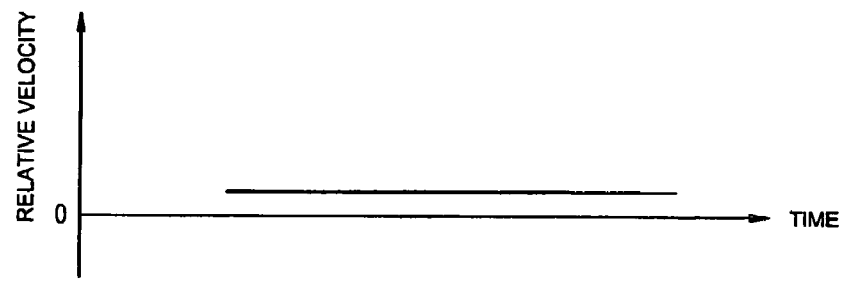

If the carrying of the TAB tape 1 starts, the heater 11 also starts to move in the carrying direction from the carry starting position at about 13.2 cm/second. Next, if the carry standby of the TAB tape 1 starts, the heater 11 returns at the carry standby starting position and starts to move in the opposite carrying direction at about 1.8 cm/second. Thus, as shown in FIG. 5 (b), the movement velocity of the heater 11 is repeated periodically. That is, it moves in the carrying direction at Vc≈(nearly equal) 13.2 cm/second if the TAB tape 1 is in the carried state, and it moves in the opposite direction at Vs=|Vt−Vc|≈1.8 cm/second if the TAB tape 1 is in the carry standby state.

As shown in FIG. 5 (c), the relative velocity between the TAB tape 1 and the heater 11 is kept constant, that is, Vs≈1.8 cm/second. As a result, the TAB tape 1 always passes through the heater 11 at the constant velocity. Thereby, the heated surface of the TAB tape 1 always passes through the pre-heater 11a, the main heater 11b and the cooler 12, successively in that order at the constant velocity, by which the TAB tape 1 and the electronic components are solder-bonded to each other.

Thus, as with the case where the TAB tape 1 passes through a fixed-type reflow device at a constant velocity, such heating that temperature change over time is constant is surely implemented for TAB tape 1.

In this case, since it is composed so that the distance Dc, for which the heater 11 moves while the TAB tape 1 is carried and the distance Ds, for which the heater 11 moves while the TAB tape 1 is on standby may be equal to each other, and also, the heater 11 may go and come within the steady section, it is possible to prevent the movement space of the heater 11, in other words, the driving range of the belt conveyer 7 from increasing.

In addition, the TAB tape 1 is brought into surface contact with the metal belt 10, it is possible to keep a certain distance between the TAB tape 1 and the heater 11. Furthermore, since the rollers 9a and 9b are to be driven so that the relative velocity between the metal belt 10 and the TAB tape 1 on both their contact face may be 0 (zero), it is possible to prevent the friction between the metal belt 10 and the TAB tape 1.

During the intermittent carrying of the TAB tape 1 in the steady state, if anything wrong happens during solder printing or electronic components mounting which causes an abnormal stoppage of the carrying of the TAB tape 1, the controller 14 makes the heater 11 continue to move in the opposite carrying direction at the carry standby time movement velocity, Vs≈1.8 cm/second. Thereby, it is possible to keep heating the heated surface of the TAB tape 1 with the constant temperature change over time.

Here, the movable range of the belt conveyer 7 includes the steady section in which it moves if the carrying of the TAB tape 1 is in the steady state, and the unsteady section in which it moves in the opposite carrying direction beyond the steady section if the TAB tape 1 stops abnormally. The heater 11 can move not only in the steady section but also to the side beyond the carry starting position. As a result, it is possible to give further heating so that the temperature change over time of the carried member may be constant, if the TAB tape 1 is stopped abnormally and the heater 11 moves in the opposite carrying direction.

During this process, if the abnormal stoppage of the TAB tape 1 is cancelled and the carrying starts, the heater 11 starts to move again in the carrying direction at Vc≈13.2 cm/second, and returns to its normal operation at the steady time again.

However, if the abnormal stoppage of the TAB tape 1 is still not cancelled, so it is impossible to drive the heater 11 to keep the constant relative velocity to the TAB tape 1, the driving of the heater 11 and the rollers 9a and 9b is stopped. At the same time, the elasticity mechanism 13 is driven so as to evacuate the heater 11 to the evacuation position. Thereby, overheating of the TAB tape 1 caused by the radiation from the heater 11 can be surely prevented.

After that, if the TAB tape 1 starts to be carried again, it is necessary to extend the elasticity mechanism 13 to the steady position, to return the heater 11 to the carry starting position or the carry standby starting position and at the same time, to move the TAB tape 1 so that the portion of the TAB tape 1 for which heating starts corresponding to the position of the heater 11. Then, the TAB tape 1 returns to the operation at the steady time.

As described above, it is possible to give such heating that the temperature change over time is constant to the whole heated surface of the TAB tape 1, which is carried intermittently, by controlling the driving of the belt-conveyer 7 to move the heater 11, as follows. That is, if the TAB tape 1 is in the carried state, the heater 11 moves in the carrying direction at the carry time movement velocity that is slower than the carry velocity of the TAB tape 1. On the other hand, if the TAB tape 1 is in the carry standby state, the heater 11 moves in the opposite carrying direction at the carry standby time movement velocity derived from the difference between the carry velocity and the carry time movement velocity.

In the above embodiment, the case where a carried member carried intermittently is the TAB tape 1 carried by the means of a reel-to-reel device was described, as an example. However, the present invention is not limited to this example. This invention can be applied to any carried member and any carrying method as long as reflow is implemented for a carried member that is intermittently carried.

In the first embodiment, the case where the heater 11 is disposed at the lower surface of the TAB tape 1 to reflow was described, the present invention is not limited to this example. The reflow may be implemented by heating from any sides and even from a plurality of sides.

Furthermore, in the first embodiment, the case where the cooler 12 is provided in order to encourage the re-solidification of the melted solder by the heater 11 was described. The present invention is not limited to this example. If only the temperature of the solder is made lower than the melting point, the cooler 12 may be omitted.

Figure 6:
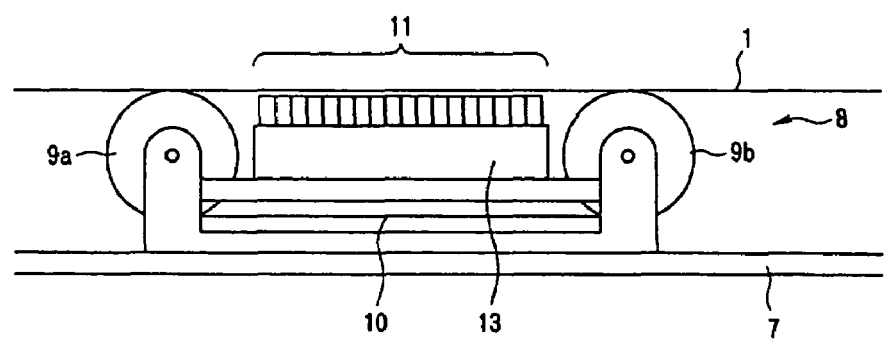
FIG. 6 shows an embodiment where a plurality of stages is provided for a heater is provided.

In the first embodiment, the case where the temperature of the TAB tape 1 is made higher through two stages was described, by pre-heater 11 and the main heater 11b. This invention is not limited to this example. As shown in FIG. 6, the temperature of the TAB tape 1 is made gradually higher through many stages.

Also, in the first embodiment, it is explained that the elasticity mechanism 13 includes an air-cylinder to evacuate the heater 11 from the TAB tape 1. This invention is not limited to this example. By way of example, the heater 11 may be evacuated from the TAB tape 1 by a cam mechanism. The point is that any mechanism can be used as far as it is possible to make the heater 11 move near or far away from the TAB tape 1.

In the first embodiment, the case where the metal belt 10 rotating with the rollers 9a and 9b is disposed in the heating unit 8 to prevent the slack of the TAB tape 1 and keep a constant distance between the TAB tape 1 and the heater 11 was described. This invention is not limited to this example. If the slack of the TAB tape 1 can be prevented by any other means, it is possible to omit these rollers 9a and 9 and the metal belt 10 from the heating unit 8.

In the first embodiment, it is explained that the cream solder is used as the junction material to connect the TAB tape 1 and the electronic components. This invention is not limited to this example. That is, solder without lead, metal such as alloy of Au and Sn and so on and resin with conductivity can be also used, for example.

Figure 7A:
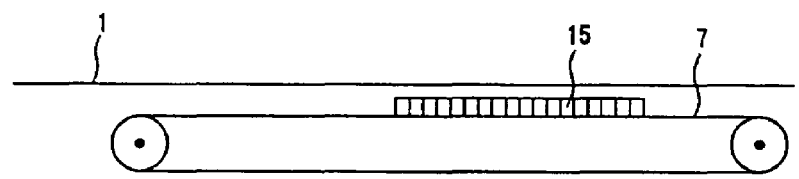
FIGS. 7A and B show a reflow device in a second embodiment.
Figure 7B:
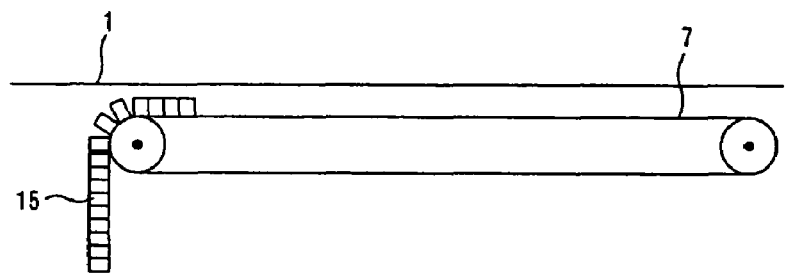
Figure 8:
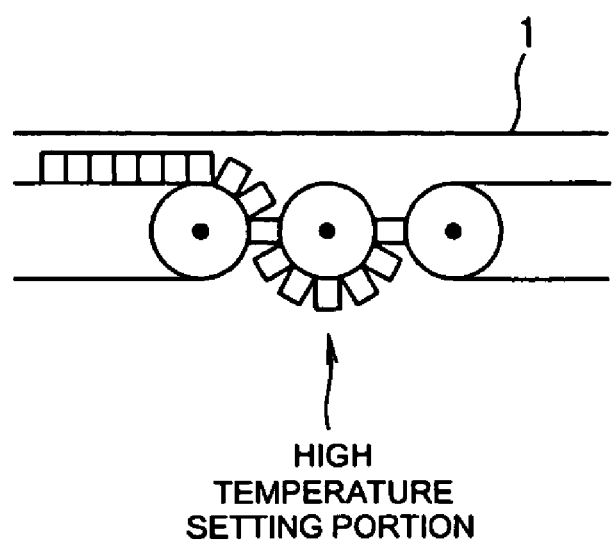
FIG. 8 shows another embodiment to evacuate a belt-shape heater.

Next, the second embodiment of the present invention is described, referring to FIGS. 7 and 8.

According to the second embodiment, the heater 11 is disposed directly to the belt-conveyer 7, in the first embodiment.

In the second embodiment, as shown in FIG. 7(a), the heating unit 8 is omitted. Many heating sheets, whose given temperature is made gradually higher from the up stream of the carrying direction, are concatenated to each other in the carrying direction to form a flexible belt-shape heater 15. The second embodiment includes the same structure as that of the first embodiment except that one end at the down stream side of the belt-shape heater 15 is fixed to the belt-conveyer 7, detailed explanation therefore is omitted here.

According to this, it is possible to evacuate the belt-shape heater 15 from the TAB tape 1 by just driving the belt conveyer 7. If the carrying of the TAB tape 1 is abnormally stopped, the belt-shape heater 15 is moved in the opposite carrying direction at the carry standby time movement velocity Vs. Then, as shown in FIG. 7(b), if the belt-shape heater 15 is beyond the up stream end of the belt-conveyer 7, the belt-shape heater 15 gradually falls down from its up stream end.

In the case of evacuating the belt-shape heater 15 from the TAB tape 1, only heating sheets having temperatures set to be higher than others need be evacuated from the TAB tape 1, as shown in FIG. 8.

What is claimed is:

1. A reflow device comprising:
   a carried member that is intermittently carried;
   a heating unit including:
      a heater for heating said carried member;
      a belt on at least one roller with part of the belt in contact with the carried member; and
      an elasticity mechanism for controlling a proximity of the heater to the part of the belt in contact with the carried member;
   a driving mechanism to drive the heating unit back and forth along a carrying direction of the carried member; and
   a driving controller to control the driving of the driving mechanism, the driving of the at least one roller, and a position of the elasticity mechanism based on a carry velocity of the carried member;

wherein the driving controller maintains a constant relative velocity between the carried member and the heating unit and a zero relative velocity between the carried member and the part of the belt in contact with the carried member.

2. The reflow device according to claim 1, wherein the driving controller controls the driving of the driving mechanism so that the heating unit moves in the carrying direction at a carry time movement velocity that is slower than a carry velocity of the carried member if the carried member is in a carried state, and the heating unit moves in an opposite carrying direction at a carry standby time movement velocity derived from a difference between the carry velocity and the carry time movement velocity if the carried member is in a carry standby state.

3. The reflow device according to claim 2, wherein the driving controller controls the driving of the driving mechanism so that the heating unit moves in the opposite carrying direction at the carry standby time movement velocity if the carrying of the carried member stops abnormally.

4. The reflow device according to claim 1, wherein the driving controller controls the driving of the driving mechanism so that the heating unit reciprocates in a steady section between a carry starting position and a carry standby starting position if the intermittent carrying of the carried member is in a steady state.

5. The reflow device according to claim 4, wherein the driving mechanism comprises an unsteady section beyond the carry starting position from the steady section to which the heating unit moves.

6. The reflow device according to claim 1 wherein the elasticity mechanism evacuates the heater from the part of the belt in contact with the carried member if the carrying of the carried member stops abnormally and the driving of the heating unit by the driving mechanism to keep the relative velocity to the carried member constant becomes impossible.

* * * * *